(12) United States Patent
Pashov

(10) Patent No.: US 12,204,922 B2
(45) Date of Patent: Jan. 21, 2025

(54) CROSS-CONTAINER DELEGATION

(71) Applicant: Microsoft Technology Licensing, LLC, Redmond, WA (US)

(72) Inventor: Ivan Dimitrov Pashov, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 794 days.

(21) Appl. No.: 17/178,983

(22) Filed: Feb. 18, 2021

(65) Prior Publication Data

US 2022/0197666 A1    Jun. 23, 2022

Related U.S. Application Data

(60) Provisional application No. 63/129,149, filed on Dec. 22, 2020.

(51) Int. Cl.
  *G06F 9/455*    (2018.01)
(52) U.S. Cl.
  CPC ............ *G06F 9/45558* (2013.01); *G06F 2009/45579* (2013.01); *G06F 2009/45595* (2013.01)
(58) Field of Classification Search
  CPC ....... G06F 9/45558; G06F 2009/45579; G06F 2009/45595; G06F 9/455
  See application file for complete search history.

(56) References Cited

U.S. PATENT DOCUMENTS

| | | | |
|---|---|---|---|
| 6,085,217 A | 7/2000 | Ault et al. | |
| 7,430,738 B1 | 9/2008 | Sanders et al. | |
| 8,132,176 B2 | 3/2012 | Mazzaferri et al. | |
| 8,966,464 B1 | 2/2015 | Christopher et al. | |
| 10,193,963 B2 | 1/2019 | Gummaraju et al. | |
| 10,353,737 B2 | 7/2019 | Pashov | |
| 10,389,697 B1 | 8/2019 | Kulkarni et al. | |
| 10,725,829 B2 | 7/2020 | Qiu et al. | |
| 2018/0091447 A1* | 3/2018 | Jared .................. | H04L 47/58 |
| 2018/0129533 A1 | 5/2018 | Pashov | |

(Continued)

OTHER PUBLICATIONS

"International Search Report and Written Opinion Issued in PCT Application No. PCT/US21/057489", Mailing Date: Feb. 11, 2022, 10 Pages.

(Continued)

*Primary Examiner* — Kenneth Tang

(74) *Attorney, Agent, or Firm* — Newport IP, LLC; Jacob P. Rohwer

(57) ABSTRACT

A computing system delegates a request between a first container in user mode of an operating system on a webserver system and a second container in the user mode of the operating system. The operating system includes a kernel. A service in the second container creates a delegation queue in the kernel of the operating system. The service adds an identifier as a property of the delegation queue in the kernel, wherein the identifier is unique across the first container and the second container. A router executing in the first container opens the delegation queue in the kernel using the identifier, responsive to the adding operation. The request is delegated to the service executing in the second container via the delegation queue in the kernel, responsive to the opening operation.

13 Claims, 6 Drawing Sheets

(56) References Cited

U.S. PATENT DOCUMENTS

2019/0075063 A1* 3/2019 Mcdonnell .............. H04L 49/70
2019/0227842 A1* 7/2019 Qiu ....................... G06F 9/5061
2019/0288922 A1   9/2019 Viklund
2019/0303345 A1* 10/2019 Zhu ..................... H04L 67/1097

OTHER PUBLICATIONS

Chekin, Pavel, "Kubernetes multi-container pods and container communication", Retrieved from: https://www.mirantis.com/blog/multi-container-pods-and-container-communication-in-kubernetes/, Aug. 28, 2017, 20 Pages.

Kontridze, George, "Lessons learned from using Docker Swarm mode in production", Retrieved from: https://www.bugsnag.com/blog/container-orchestration-with-docker-swarm-mode, Sep. 15, 2016, 08 Pages.

* cited by examiner ively separately executing in a contained namespace of execution environment for and settings, including a contained namespace isolated from and inaccessible by other containers and processes. In some implementations, the processing of HTTP requests can involve multiple HTTP requests flowing via a complicated internal routing through the webserver.

CROSS-CONTAINER DELEGATION

CROSS-REFERENCE TO RELATED APPLICATIONS

The present application claims benefit of priority to U.S. Provisional Patent Application No. 63/129,149, entitled "Cross-container Delegation" and filed on Dec. 22, 2020, which is specifically incorporated by reference for all that it discloses and teaches.

BACKGROUND

When executing web services on a webserver, HTTP (HyperText Transfer Protocol) requests are received from a client system by the webserver through a TCP/IP (Transmission Control Protocol/Internet Protocol) stack executing on the webserver. Responses are generated by the webserver and communicated to the client system, taking a reverse path through the TCP/IP stack. Furthermore, webserver execution, development, deployment, configuration, and administration can be made more reliable, flexible, and secure by executing individual service processes and/or microservices of one or more web services in containers. A container is a unit of software that packages an execution environment for running application code, runtime code, system tools, system libraries, and settings, including a contained namespace isolated from and inaccessible by other containers and processes. In some implementations, the processing of HTTP requests can involve multiple HTTP requests flowing via a complicated internal routing through the webserver.

SUMMARY

The described technology provides a computer system delegates a request between a first container in user mode of an operating system on a webserver system and a second container in the user mode of the operating system. The operating system includes a kernel. A service in the second container creates a delegation queue in the kernel of the operating system. The service adds an identifier as a property of the delegation queue in the kernel, wherein the identifier is unique across the first container and the second container. A router executing in the first container opens the delegation queue in the kernel using the identifier, responsive to the adding operation. The request is delegated to the service executing in the second container via the delegation queue in the kernel, responsive to the opening operation.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Using containers to package processes (e.g., one or more host processes, router processes, service processes, microservice processes) in a webserver provides process isolation that can yield increased reliability, flexibility, and security. For example, as different web services and/or subcomponents of web services executing on a webserver are maintained (e.g., repaired, upgraded), other web services and/or subcomponents need not be affected. A service in one container can be terminated, upgraded, and restarted, while a service in another container can remain executing undisturbed. Furthermore, processes running in different containers can depend on different versions of platforms, libraries, etc. within their own containers. However, processes in different containers are isolated from each other in user mode, making high performance, cross-container communications a challenge.

By routing cross-container delegation of HTTP requests through a delegation queue in the kernel of the operating system, a router process in one container can evaluate an incoming HTTP request in user mode and delegate it to the delegation queue associated with a destination service process executing in another container. The delegation queue is or includes a request queue in the kernel of the operating system that is enabled for delegation to one or more user mode processes in the webserver. In this manner, the service can receive routed HTTP requests delegated by a router process in another container without the overhead of multiple internal HTTP requests and the overhead (e.g., open sockets, processing time) they engender.

Figure 1:
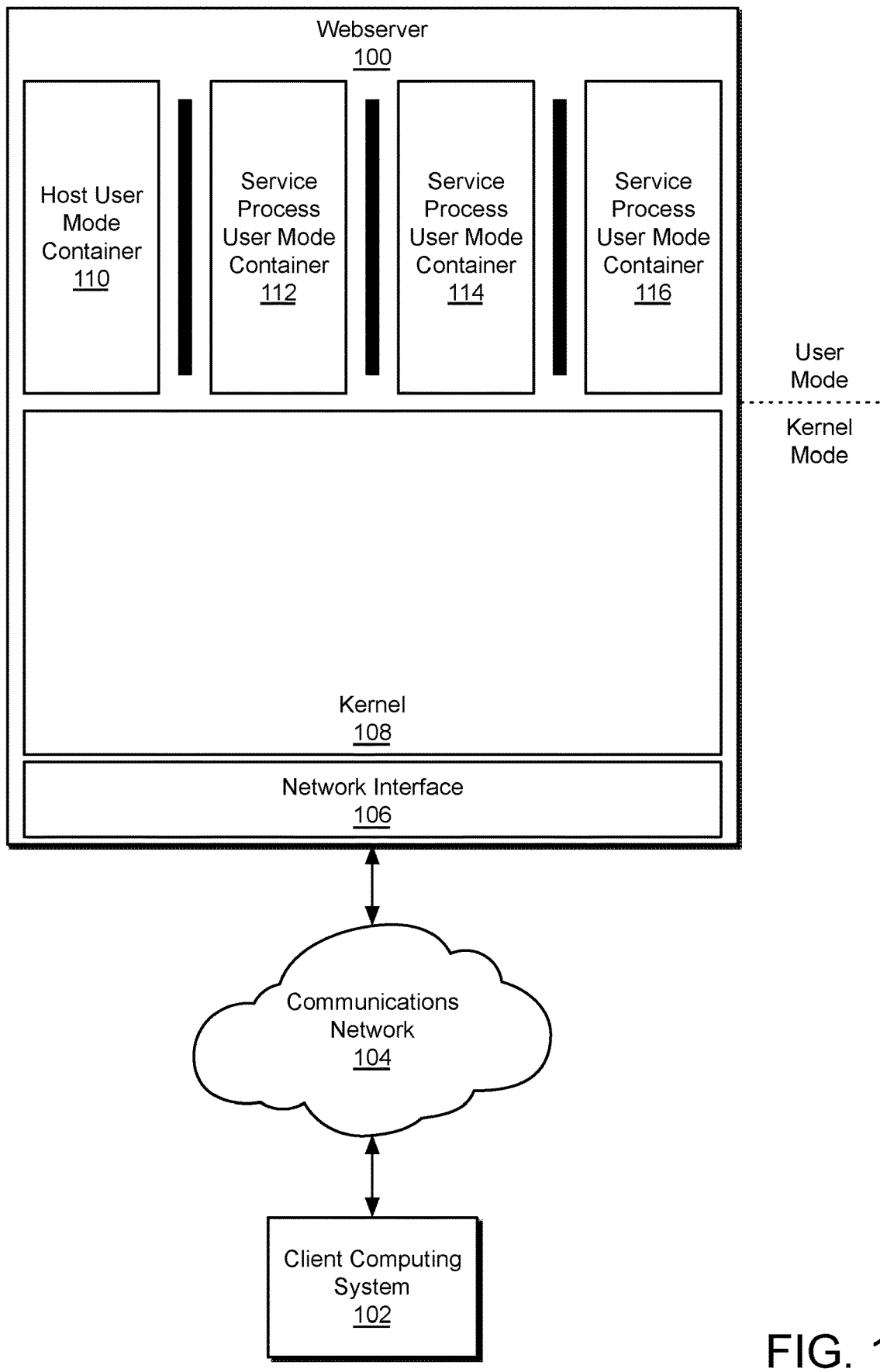
FIG. 1 illustrates an example webserver supporting cross-container delegation of requests.

FIG. 1 illustrates an example webserver 100 supporting cross-container delegation of requests. A client computing system 102 sends HTTP requests to and receives HTTP responses from the webserver 100 via a communications network 104 and a network interface 106 of the webserver 100. The requests and responses are communicated through a network stack in the kernel 108 of the webserver's operating system for processing by user mode processes, such as a router process, service processes, etc.

In user mode, processes executing in one container are isolated from processes in other containers. As such, a router process executing in a host user mode container 110 is isolated from service processes executing in a service process user mode container 112, a service process user mode container 114, and a service process user mode container 116. Likewise, processes in each of those containers are isolated from processes from all other containers. For example, processes in different containers do not share a common namespace in user mode, and data in one container is not accessible to processes in other containers. A namespace is a declarative region that provides a scope to the identifiers (the names of types, functions, variables, etc.) inside it. Namespaces are used to organize code into logical groups and to prevent name collisions that can occur, especially when the codebase includes multiple libraries. Identifiers at namespace scope are visible to one another without qualification. The isolation between containers is illustrated by the solid black lines positioned between each container in FIG. 1.

Figure 2:
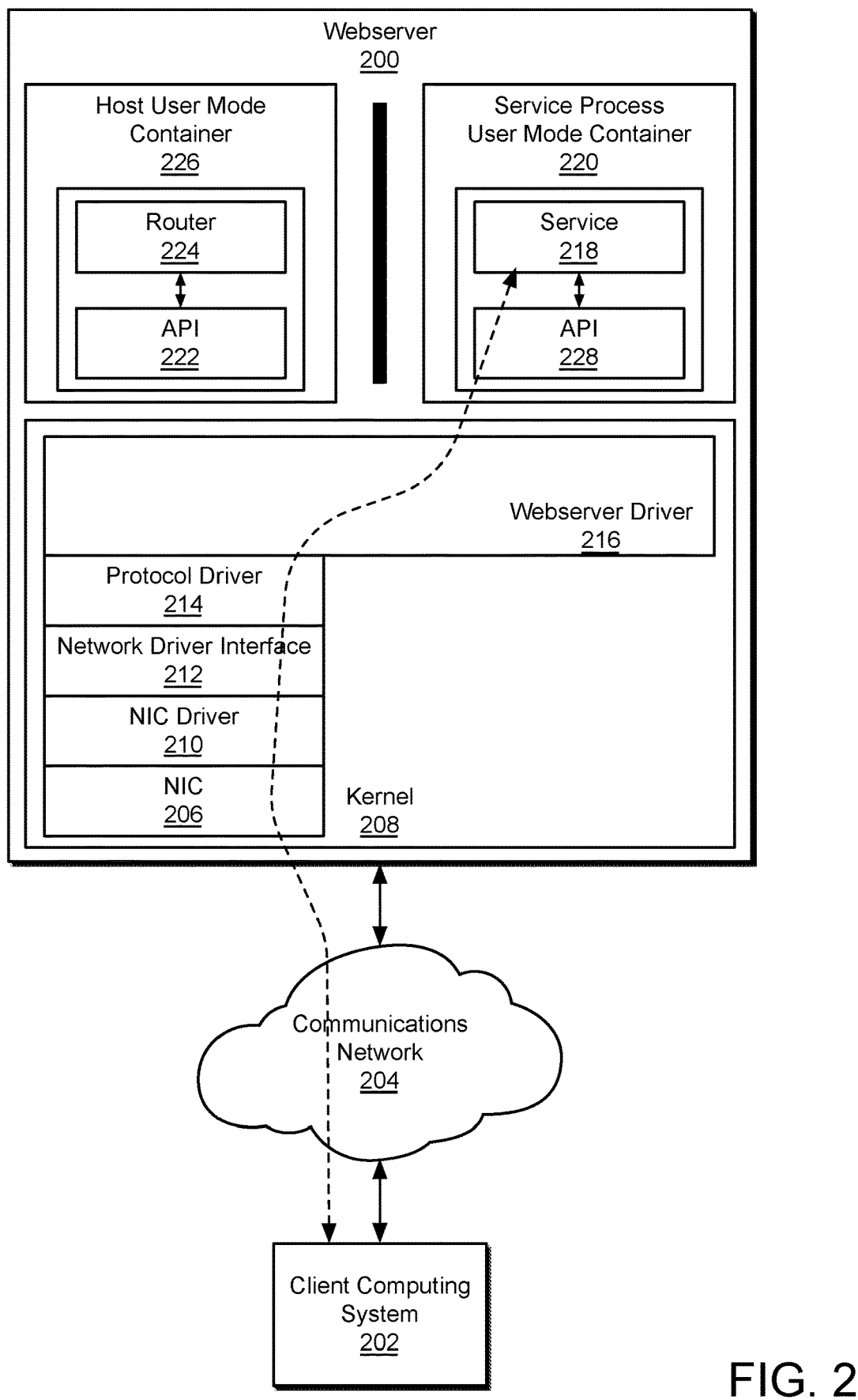
FIG. 2 illustrates a request flowing through a network stack in an example webserver supporting cross-container delegation of requests.

FIG. 2 illustrates a request flowing through a network stack in an example webserver 200 supporting cross-container delegation of requests. A client computing system 202 sends HTTP requests to and receives HTTP responses from the webserver 200 via a communications network 204 and a network interface 206 (e.g., a "NIC" or "network interface card") of the webserver 200. The requests and responses are communicated through a network stack in the kernel 208 of the webserver's operating system for processing by user mode processes, such as a router process, service processes, etc.

The network stack includes multiple hardware and software layers, including the network interface 206, a NIC driver 210, a network driver interface 212 (e.g., ndis.sys), and a protocol driver 214 (e.g., a TCP/IP protocol driver, such as tcpip.sys). A webserver driver 216 (e.g., http.sys) is an HTTP protocol driver running in the kernel between the TCP/IP protocol driver and the user mode router and service processes (e.g., a web service processes, HTTP service process, a microservice process, webserver applications).

When a request is received by the webserver 200, the request is communicated "up" the network stack to a routing queue in the webserver driver 216. Through an API 222 (Application Programming Interface), a router process 224 in a host user mode container 226 evaluates the received request in the webserver driver 216 (e.g., by reading the header and/or addressing information) to determine how the request should be routed within the webserver 200. The router process 224 may decide to drop the request (e.g., delete it from the queue without further processing), send back a cached response without delegating the request to another container, or delegate the request to a delegation queue in the webserver driver 216 for processing of the request by a process in another container, etc. When the router process 224 delegates the request to a process in another container, the router process 224 instructs the webserver driver 216 to move the request from the routing queue to the appropriate delegation queue for access by a service process 218 in a service process user mode container 220. The service process 218 accesses the request in the delegation queue of the webserver driver 216 running in kernel mode via an API 228. Responses from the service process 218 can be communicated to the client computing system 202 via the API 228, webserver driver 216, protocol driver 214, the network driver interface 212, the NIC driver 210, and the network interface 206, without the need for queues or delegation.

Figure 3:
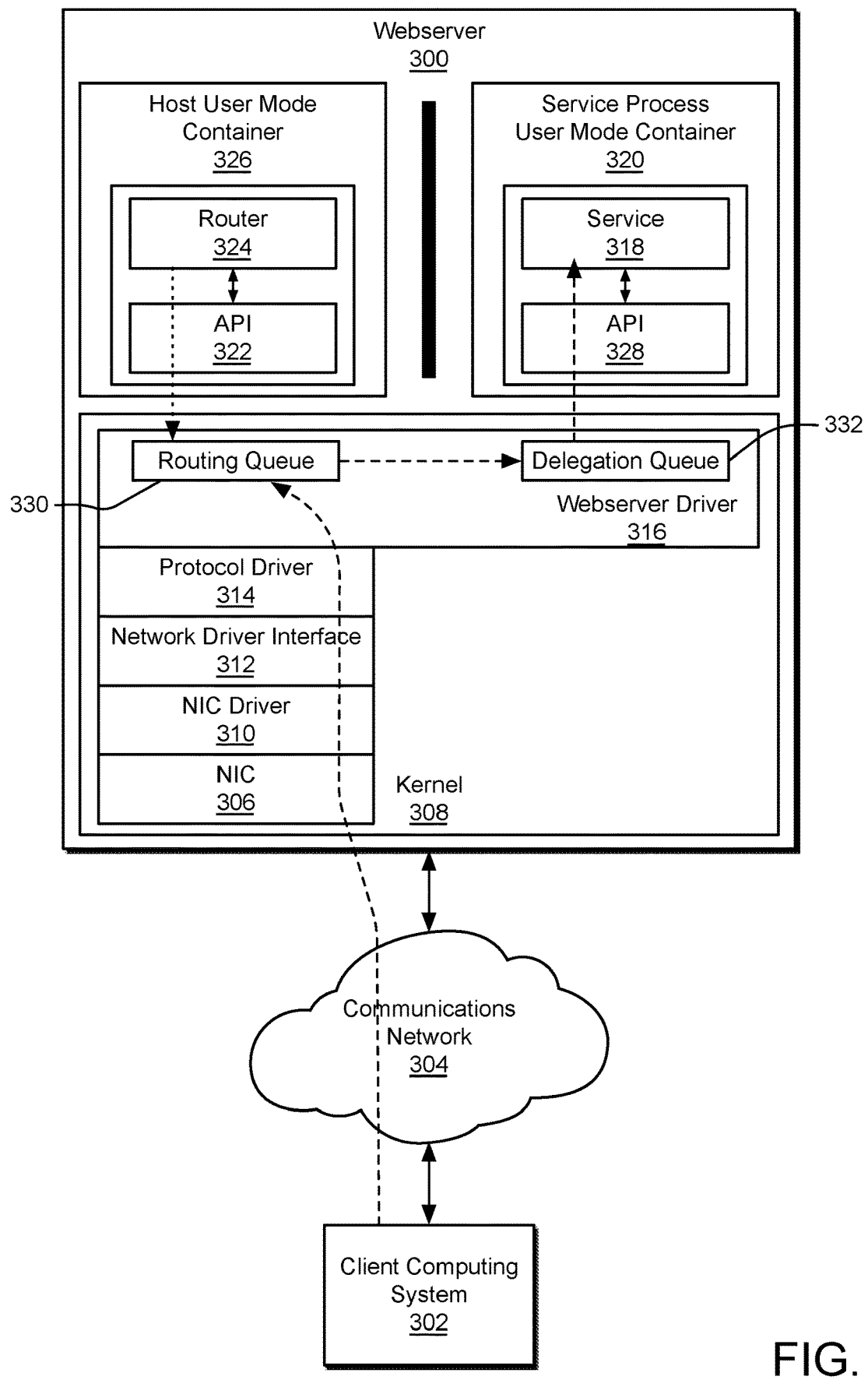
FIG. 3 illustrates request delegation in an example webserver supporting cross-container delegation of requests.

FIG. 3 illustrates request delegation in an example webserver 300 supporting cross-container delegation of requests. A client computing system 302 sends HTTP requests to and receives HTTP responses from the webserver 300 via a communications network 304 and a network interface 306 of the webserver 300. The requests and responses are communicated through a network stack in the kernel 308 of the webserver's operating system for processing by user mode processes, such as a router process, service processes, etc.

The network stack includes multiple hardware and software layers, including the network interface 306, a NIC driver 310, a network driver interface 312, and a protocol driver 314. A webserver driver 316 is an HTTP protocol driver running in the kernel between the TCP/IP protocol driver and the user mode router and webserver processes (e.g., a web service process, a microservice process). The webserver driver 316 includes a routing queue 330 for receiving service requests from the network stack. In one implementation, routing queue 330 may be created by a router process 324 via a queue creation API in the API 322, although other user mode or kernel processes may create the routing queue 330. The routing queue 330 is or includes a request queue that can be accessed by the router process 324. The router process 324 executes in a host user mode container 326 and can create the routing queue using an example queue creation API:

```
HTTPAPI_LINKAGE
ULONG
WINAPI
HttpCreateRequestQueue(
    IN HTTPAPI_VERSION Version,
    IN PCWSTR Name OPTIONAL,
    IN PSECURITY_ATTRIBUTES SecurityAttributes
    OPTIONAL,
    IN ULONG Flags OPTIONAL,
    OUT PHANDLE RequestQueueHandle
);
```

The (optional) "Name" parameter uses a locally unique queue identifier (i.e., locally unique in the namespace of the host user mode container 326). If a NULL is passed in as the Name parameter, then the queue has no name and cannot be opened by another caller.

The webserver driver 316 also includes a delegation queue 332, which is created by a service process 318 in a service process user mode container 320 using a queue creation API (e.g., HttpCreateRequestQueue) via the API 328. (It should be understood that the webserver 300 may include multiple service process user mode containers and service processes, as described with reference to FIG. 1.) The "Name" parameter uses a locally unique queue identifier (i.e., locally unique in the namespace of the service process user mode container 320). Other delegation queues corresponding to other service processes and/or other containers may also reside in the webserver driver 316.

The service process 318 also sets a globally unique name as a property of the delegation queue 332 using a property API via the API 328. The globally unique identifier may be a static globally unique identifier, some combination of a locally unique identifier and a globally unique identifier, or some other globally unique parameter. The service process 318 set the globally unique name as a property of the delegation queue 332 using an example property API:

```
HTTPAPI_LINKAGE
ULONG
WINAPI
HttpSetRequestQueueProperty(
    _In_HANDLE RequestQueueHandle,
    _In_HTTP_SERVER_PROPERTY Property,
    _In_reads_bytes_(PropertyInformationLength) PVOID
    PropertyInformation,
    _In_ULONG PropertyInformationLength,
    _Reserved_ULONG Reserved1,
    _Reserved_PVOID Reserved2
);
``` where HTTP_SERVER_PROPERTY is given as:

```
typedef enum_HTTP_SERVER_PROPERTY
{
. . .
```

```
;begin_internal
//
// Used to identify the request queue if there are
  multiple active containers
//
    HttpServerExternalIdProperty = 17,
;end_internal
;begin_both
} HTTP_SERVER_PROPERTY, *PHTTP_SERVER_PROPERTY;
```

Example code for calling this example property API is shown below:

```
Error = HttpSetRequestQueueProperty(RequestQueue,
            HttpServerExternalIdProperty,
            ExternalId,
            ExternalIdSize,
            0,
            NULL);
``` where ExternalId is or includes (e.g., by combination with other data) the globally unique identifier of the delegation queue for the service process 318 and/or the service process user mode container 320.

The API calls described above present a two-call process, one call for creating the delegation queue and a second call for creating the globally unique identifier property. It should be understood that alternative implementations may create the delegation queue and set the globally unique identifier property in a single API call (or even in more than two API calls).

Because processes in the two containers do not share a common namespace, the router process 324 does not simply call to the delegation queue 332 directly using a locally unique queue identifier used by the service process 318 when the delegation queue 332 was created. Accordingly, the router process 324 obtains the globally unique identifier used by the service process 318 to set the property of the delegation queue 332 and uses the globally unique identifier to open the delegation queue 332 for access by the router process 324 in kernel mode. For example, in one implementation, the globally unique identifier for a particular delegation queue is recorded in a configuration datastore (e.g., by a network administrator). As such, in one implementation, the router process 324 obtains the globally unique identifier externally, rather than from the service process user mode container 320. In an alternative implementation, the router process 324 constructs the globally unique identifier from a combination of an external identifier and the locally unique name used in the service process user mode container 320, both of which are extracted from an external configuration datastore by the router process 324.

In one implementation, the process of opening a request queue is performed to obtain a handle to that queue for the calling process. For example, the router process 324 can use an API call to the webserver driver 316, and the globally unique identifier to identify the delegation queue 332 that it wants to access, to open the delegation queue 332 for access by the router process 324. The webserver driver 316 receives from the router process 324 the globally unique identifier for the delegation queue 332, identifies the appropriate delegation queue having the property that satisfies the globally unique identifier, and returns a handle for the delegation queue 332 to the router process 324. Thereafter, the router process 324 can access and/or reference the delegation queue 332 using the returned handle. As previously discussed, the globally unique identifier may be a static globally unique identifier, some combination of a locally unique identifier and a globally unique identifier, or some other globally unique parameter.

The router process 324 can employ the globally unique identifier for the delegation queue 332 of the service process 318 to open the delegation queue 332 for access by the router process 324 using an open existing queue API via the API 322:

```
HTTPAPI_LINKAGE
ULONG
WINAPI
HttpCreateRequestQueueEx(
    _In_ HTTPAPI_VERSION Version,
    _In_ PCWSTR Name OPTIONAL,
    _In_ PSECURITY_ATTRIBUTES SecurityAttributes
        OPTIONAL,
    _In_ ULONG Flags OPTIONAL,
    _In_ ULONG PropertyInfoSetSize,
    _In_opt_ PHTTP_CREATE_REQUEST_QUEUE_PROPERTY_INFO
        PropertyInfoSet,
    _Out_ PHANDLE RequestQueueHandle
);
``` where the (optional) Name parameter may be a locally unique queue name in the namespace of the host user mode container 326 that contains the router process 324, and the Flags are set to specify an existing queue, corresponding to the PropertyInfoSet (i.e., the globally unique identifier) is to be opened for access by the router process 324 in kernel mode.

Example code for calling this open existing queue API is shown below:

```
RequestQueuePropertyInfo.PropertyInfo = ExternalId;
RequestQueuePropertyInfo.PropertyInfoLength = ExternalIdSize;
PropertyInfoSetSize = 1;
Result = HttpCreateRequestQueueEx(ApiVersion,
            DelegateRequestQueueName,
            NULL,
            HTTP_CREATE_REQUEST_QUEUE_FLAG_OPEN_EXISTING |
            HTTP_CREATE_REQUEST_QUEUE_FLAG_DELEGATION,
                PropertyInfoSetSize,
                &RequestQueuePropertyInfo,
                &DelegateRequestQueue);
```

When a request is received from the network stack, the request is stored in the routing queue 330, which is accessible by the router process 324 from the host user mode container 326. The router process 324 using a process request API via the API 322 to evaluate the request in the routing queue 330 (as shown by the dotted line arrow from the router process 324 to the routing queue 330):

```
HTTPAPI_LINKAGE
ULONG
WINAPI
HttpReceiveHttpRequest(
    IN HANDLE RequestQueueHandle,
    IN HTTP_REQUEST_ID RequestId,
    IN ULONG Flags,
    _Out_writes_bytes_to_(RequestBufferLength, *BytesReturned)
        PHTTP_REQUEST
    RequestBuffer,
    IN ULONG RequestBufferLength,
    _Out_opt_ PULONG BytesReturned,
    IN LPOVERLAPPED Overlapped OPTIONAL
);
```

Based on the evaluation, the router process 324 decides whether to handle the request itself (e.g., if the router process 324 can handle the request from a cache or by forwarding the request to a different computing device), to "fail" the request (e.g., acting as an HTTP firewall), or to delegate the request to a delegation queue for the same or different container. For example, based on data in the request (e.g., a destination service address or identifier), the router process 324 determines the process and/or container to which the request is to be routed—in FIG. 3, the target process is the service process 318, the target container is the service process user mode container 320, and the target queue is the delegation queue 332.

The router process 324 delegates the request to the appropriate delegation queue using a delegation API via the API 322:

```
HTTPAPI_LINKAGE
ULONG
WINAPI
HttpDelegateRequestEx(
    _In_HANDLE RequestQueueHandle,
    _In_HANDLE DelegateQueueHandle,
    _In_HTTP_REQUEST_ID RequestId,
    _In_HTTP_URL_GROUP_ID DelegateUrlGroupId,
    _In_ULONG PropertyInfoSetSize,
    _In_PHTTP_DELEGATE_REQUEST_PROPERTY_INFO
    PropertyInfoSet
);
```

The HttpDelegateRequestEx API call includes handles to both queues, the routing queue 330 (i.e., RequestQueueHandle), where the request was initially received from the network, and the delegation queue 332 (DelegateQueueHandle) for the service and container to which the router 324 has determined that the request should be delegated. It should be understood that delegation queues may (and will likely) be created and opened for multiple services and/or containers in the webserver 300—a single container, service, and delegation queue are shown in FIG. 3 for simplicity. The delegation operation moves the request from the identified routing queue to the identified delegation queue within the webserver driver 316 of the kernel 308.

When the service process 318 is ready to process the next request, it selects the next request from the delegation queue 332 via the API 328 and processes the request.

In another implementation, a service process may not be programmed to support the cross container delegation using the globally unique property identifier in the delegation queue. In such a scenario, the router process 324 may provide additional support to the service process by creating the delegation queue 332 using a globally unique queue identifier that is within the namespace of the service process user mode container 320. The router process 324 can obtain the queue identifier from an external source, such as a configuration file, and create the delegation queue 332 using the queue identifier. The service process 318 can then open the delegation queue 332 using the same queue identifier (which is within the namespace of its container) to access the delegation queue 332. In yet another implementation, the service process 320 can create the delegation queue using the queue identifier, and the router process 324 can open the delegation queue 332 for access using the queue identifier. In both variations, the router process 324 and the service process 318 can access the delegation queue 332 in the kernel 308 using the queue identifier, which is unique across both containers.

Figure 4:
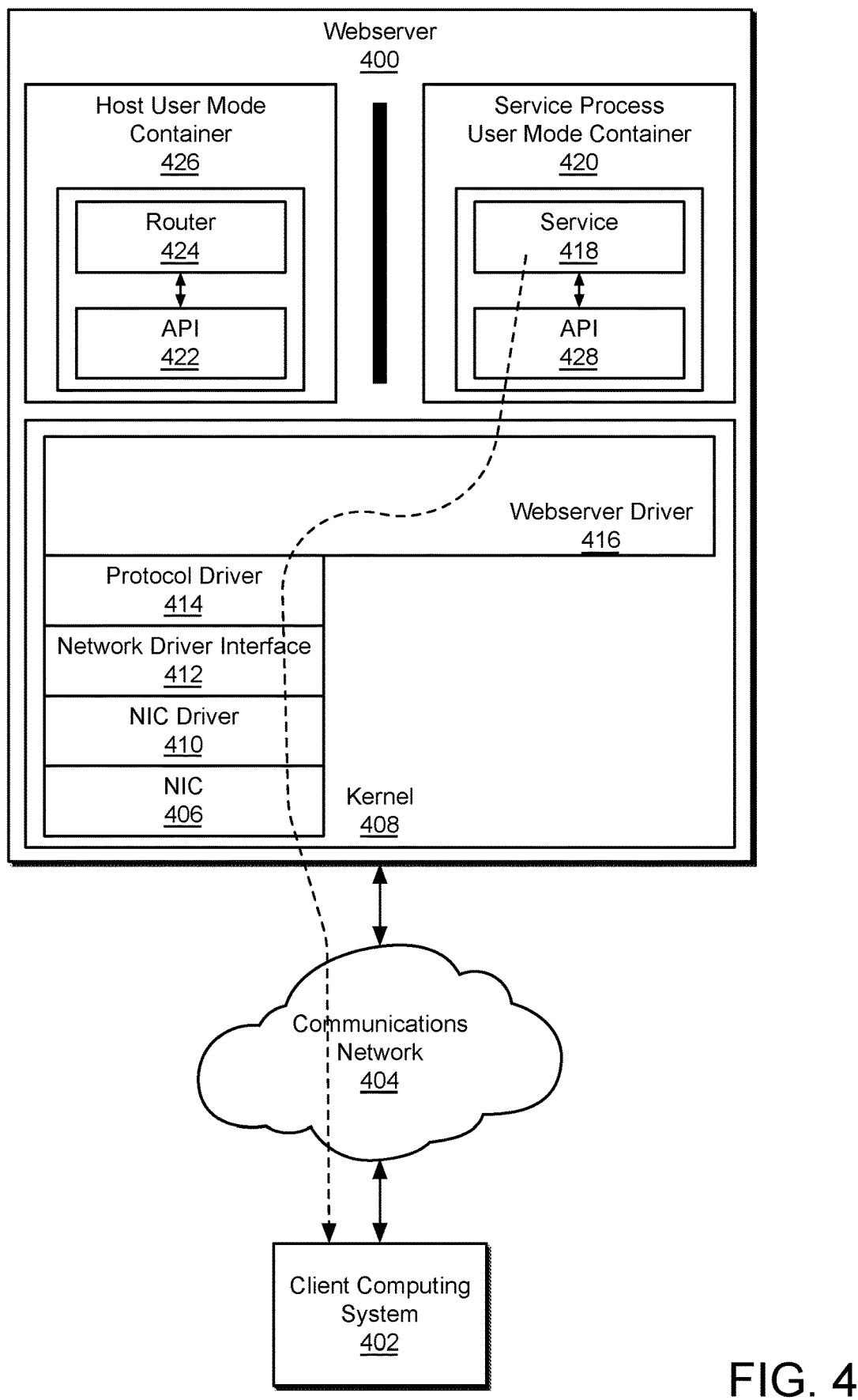
FIG. 4 illustrates a response flowing through a network stack in an example webserver supporting cross-container delegation of requests.

FIG. 4 illustrates a response flowing through a network stack in an example webserver 400 supporting cross-container delegation of requests. A client computing system 402 sends HTTP requests to and receives HTTP responses from the webserver 400 via a communications network 404 and a network interface 406 of the webserver 400. The requests and responses are communicated through a network stack in the kernel 408 of the webserver's operating system for processing by user mode processes, such as a router process, service processes, etc.

The network stack includes multiple hardware and software layers, including the network interface 406, a NIC driver 410, a network driver interface 412, and a protocol driver 414. A webserver driver 416 is an HTTP protocol driver running in the kernel between the TCP/IP protocol driver and the user mode router and webserver processes (e.g., a service process, a microservice process). A router process 424 executes in a host user mode container 426 to route incoming requests to the appropriate services executing on the webserver 400, but, in at least one implementation, the router process 424 need not participate in the communication of responses from such services. (It should be understood that the webserver 400 may include multiple service process user mode containers and service processes, as described with reference to FIG. 1.)

One such service, a service process 418 in a service process user mode container 420, processes requests and generates responses. The service process 418 sends such a response to the requester (e.g., the client computing system 402) using the API 428 via the webserver driver 416, the protocol driver 414, the network driver interface 412, the NIC driver 410, and the network interface 406. No queue delegation needs to be employed in the processing of responses.

Figure 5:
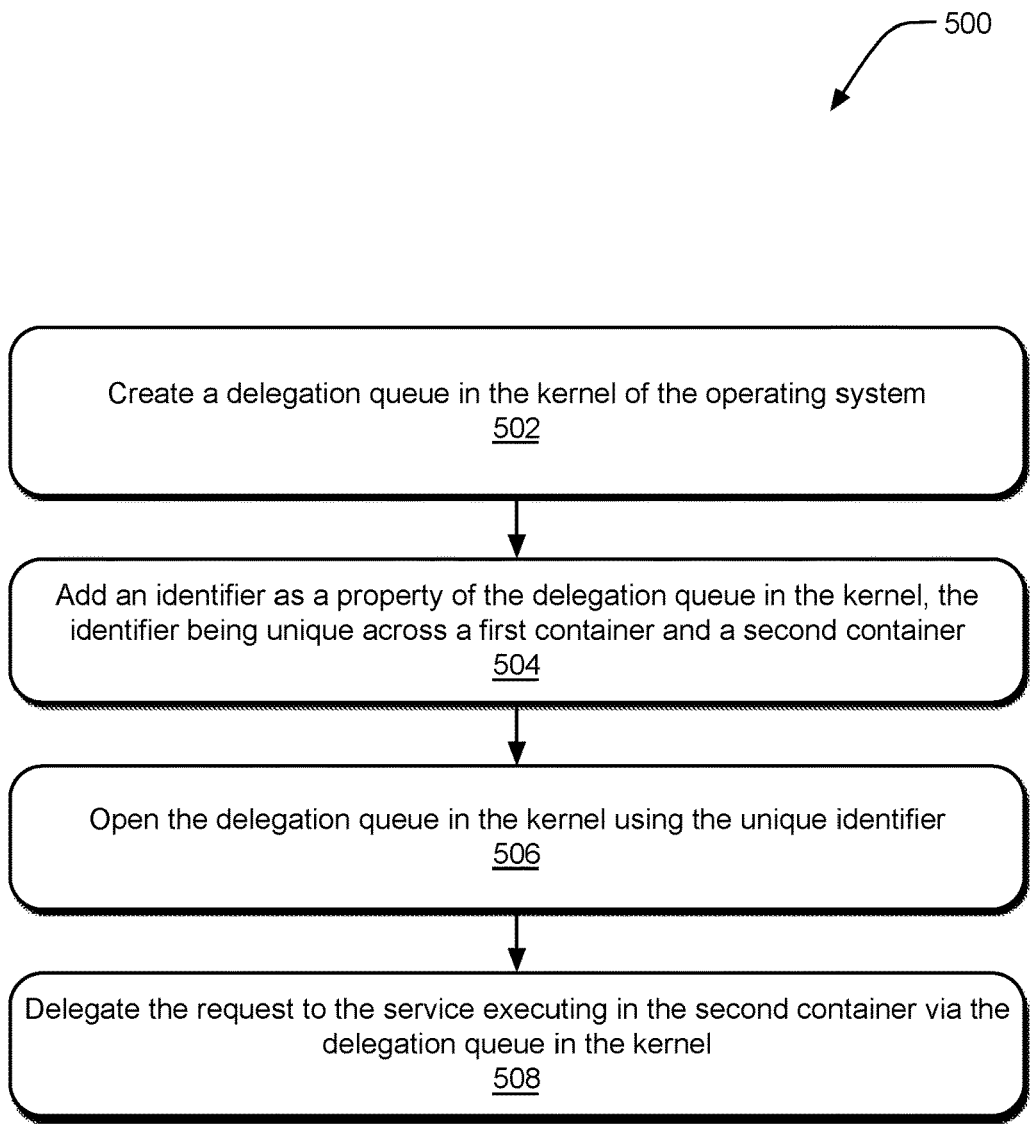
FIG. 5 illustrates example operations for delegating a request across containers in a webserver.

FIG. 5 illustrates example operations 500 for delegating a request across containers in a webserver. A queue creation operation 502 creates a delegation queue in the kernel of the operating system. For example, the service in the service process container executes a HttpCreateRequestQueue call via an API to create the delegation queue using a locally unique identifier as a "Name" parameter. Alternatively, the service can create the delegation queue using an identifier that is unique across the two containers as the "Name" parameter. A naming operation 504 adds a unique identifier as a property of the delegation queue in the kernel. This unique identifier may be the identifier that is unique across the two containers or some other unique identifier. For example, the service in the service process container executes a HttpSetRequestQueueProperty call via an API to add an ExternalId as a property of the delegation queue. The ExternalId may take many forms, including a combination of the locally unique identifier and a globally unique identifier, a static globally unique identifier, or some other globally unique parameter.

A queue opening operation 506 opens the delegation queue for access by a router process. For example, the router process in the host user mode container executes a HttpCreateRequestQueueEx call via an API to open the delegation queue in the kernel for access by the router process using the globally unique identifier (e.g., ExternalId). As previously discussed, the globally unique identifier may be a static globally unique identifier, some combination of a locally unique identifier and a globally unique identifier, or some other globally unique parameter.

A delegation operation 508 forwards a request from a routing queue in the kernel to the delegation queue in the kernel for processing by the service process. The delegation operation 508 may also include one or more of receiving the request in a routing queue in the kernel via a network stack in the kernel; determining an appropriate service process to receive the request; moving the request from the routing queue to the delegation queue in the kernel; receiving, at the service in the second container, the request from the delegation queue in the kernel; and processing the request by the service in the second container in the user mode.

Figure 6:
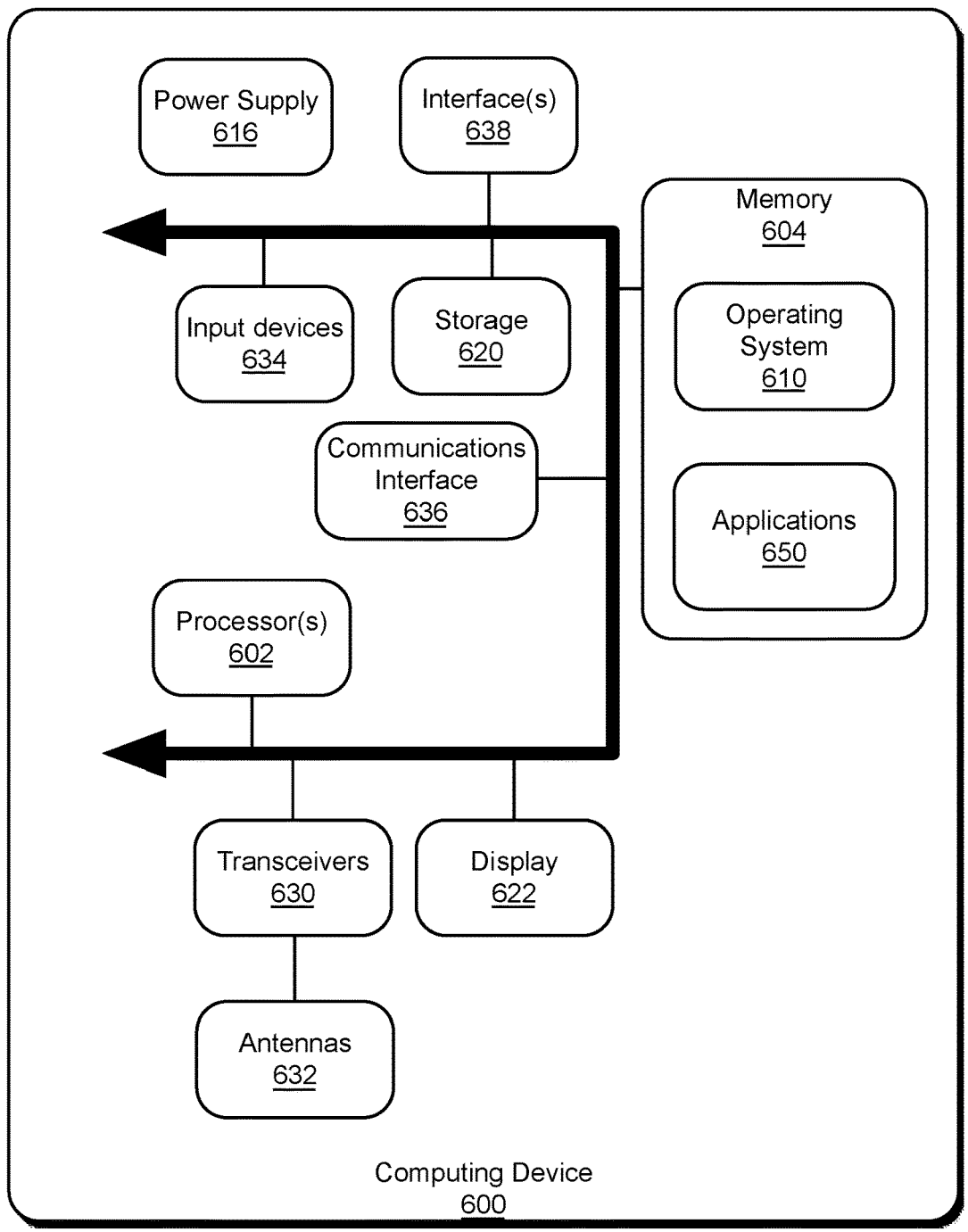
FIG. 6 illustrates exampled hardware and software that can be useful in implementing the described technology.

FIG. 6 illustrates an example computing device 600 for implementing the features and operations of the described technology. The computing device 600 may embody a remote control device or a physical controlled device and is an example network-connected and/or network-capable device and may be a client device, such as a laptop, mobile device, desktop, tablet; a server/cloud device; an internet-of-things device; an electronic accessory; or another electronic device. The computing device 600 includes one or more processor(s) 602 and a memory 604. The memory 604 generally includes both volatile memory (e.g., RAM) and nonvolatile memory (e.g., flash memory). An operating system 610 resides in the memory 604 and is executed by the processor(s) 602.

In an example computing device 600, as shown in FIG. 6, one or more modules or segments, such as applications 650, a router process, a service process, a webserver driver, a network stack, and other services, workloads, and modules, are loaded into the operating system 610 on the memory 604 and/or storage 620 and executed by processor(s) 602. The storage 620 may include one or more tangible storage media devices and may store locally and globally unique identifiers, requests, responses, and other data and be local to the computing device 600 or may be remote and communicatively connected to the computing device 600.

The computing device 600 includes a power supply 616, which is powered by one or more batteries or other power sources and which provides power to other components of the computing device 600. The power supply 616 may also be connected to an external power source that overrides or recharges the built-in batteries or other power sources.

The computing device 600 may include one or more communication transceivers 630, which may be connected to one or more antenna(s) 632 to provide network connectivity (e.g., mobile phone network, Wi-Fi®, Bluetooth®) to one or more other servers and/or client devices (e.g., mobile devices, desktop computers, or laptop computers). The computing device 600 may further include a network adapter 636, which is a type of computing device. The computing device 600 may use the adapter and any other types of computing devices for establishing connections over a wide-area network (WAN) or local-area network (LAN). It should be appreciated that the network connections shown are exemplary and that other computing devices and means for establishing a communications link between the computing device 600 and other devices may be used.

The computing device 600 may include one or more input devices 634 such that a user may enter commands and information (e.g., a keyboard or mouse). These and other input devices may be coupled to the server by one or more interfaces 638, such as a serial port interface, parallel port, or universal serial bus (USB). The computing device 600 may further include a display 622, such as a touch screen display.

The computing device 600 may include a variety of tangible processor-readable storage media and intangible processor-readable communication signals. Tangible processor-readable storage can be embodied by any available media that can be accessed by the computing device 600 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 600. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a remote control device and/or a physical controlled device 802 implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

An example method of delegating a request between a first container in user mode of an operating system on a web server system and a second container in the user mode of the operating system is provided. The operating system includes a kernel. The method includes creating, by a service executing in the second container, a delegation queue in the kernel of the operating system, adding, by the service executing in the second container, an identifier as a property of the delegation queue in the kernel, wherein the identifier is unique across the first container and the second container, opening, by a router executing in the first container, the delegation queue in the kernel using the identifier, responsive to the adding operation, and delegating the request to the service executing in the second container via the delegation queue in the kernel, responsive to the opening operation.

Another example method of any preceding method is provided, wherein the creating operation includes creating the delegation queue using another identifier local to the second container.

Another example method of any preceding method is provided, wherein the router in the first container obtains the identifier from a datastore external to the second container.

Another example method of any preceding method is provided, wherein the delegating operation includes receiving the request in a routing queue in the kernel via a network stack in the kernel, moving the request from the routing queue to the delegation queue in the kernel, receiving, at the service in the second container, the request from the delegation queue in the kernel, and processing the request by the service in the second container in the user mode.

Another example method of any preceding method is provided, wherein the router of the first container and the service of the second container run in separate namespaces in the user mode.

Another example method of any preceding method is provided, wherein the service of the second container runs in a namespace that is inaccessible to the router of the first container in the user mode.

Another example method of any preceding method is provided, wherein the router of the first container runs in a namespace that is inaccessible to the service of the second container in the user mode.

An example system for delegating a request between a first container in user mode of an operating system on a web server system and a second container in the user mode of the operating system is provided. The operating system includes a kernel. The system includes one or more hardware processors and a service configured to execute on the one or more hardware processors in the second container, to create a delegation queue in the kernel of the operating system, and to add an identifier as a property of the delegation queue in the kernel, responsive to creating of the delegation queue wherein the identifier is unique across the first container and the second container. The system further includes a router configured to execute on the one or more hardware processors in the first container, to open the delegation queue in the kernel using the identifier, responsive to addition of the identifier to the delegation queue, and to delegate the request to the service executing in the second container via the delegation queue in the kernel, responsive to opening of the delegation queue by the router.

Another example system of any preceding system is provided, wherein the service is configured to create the delegation queue using another identifier local to the second container.

Another example system of any previous system is provided, wherein the router in the first container obtains the identifier from a datastore external to the second container.

Another example system of any previous system is provided, wherein the router is further configured to move the request received in a routing queue via a networking stack from the routing queue to the delegation queue in the kernel.

Another example system of any previous system is provided, wherein the service is further configured to process the request by the service in the second container in the user mode, the request being received by the service from the delegation queue in the kernel.

Another example system of any previous system is provided, wherein the router of the first container and the service of the second container run in separate namespaces in the user mode.

Another example system of any previous system is provided, wherein the service of the second container runs in a namespace that is inaccessible to the router of the first container in the user mode, and the router of the first container runs in a namespace that is inaccessible to the service of the second container in the user mode.

One or more example tangible processor-readable storage media of a tangible article of manufacture encoding processor-executable instructions is provided for executing on an electronic computing device a process of delegating a request between a first container in user mode of an operating system on a web server system and a second container in the user mode of the operating system. The operating system includes a kernel. The process includes creating a delegation queue in the kernel of the operating system using a queue identifier that is unique across the first container and the second container, opening the delegation queue in the kernel using the queue identifier, responsive to the creating operation, and delegating the request to a service executing in the second container via the delegation queue in the kernel.

One or more other example tangible processor-readable storage media of any preceding media, wherein the delegating operation includes receiving the request in a routing queue in the kernel via a network stack in the kernel, moving the request from the routing queue to the delegation queue in the kernel, receiving, at the service in the second container, the request from the delegation queue in the kernel, and processing the request by the service in the second container in the user mode.

One or more other example tangible processor-readable storage media of any preceding media, wherein the moving operation is executed by the router in the first container.

One or more other example tangible processor-readable storage media of any preceding media, wherein the router of the first container and the service of the second container run in separate namespaces in the user mode.

One or more other example tangible processor-readable storage media of any preceding media, wherein the service of the second container runs in a namespace that is inaccessible to the router of the first container in the user mode.

One or more other example tangible processor-readable storage media of any preceding media, wherein the router of the first container runs in a namespace that is inaccessible to the service of the second container in the user mode.

An example system of delegating a request between a first container in user mode of an operating system on a web server system and a second container in the user mode of the operating system is provided. The operating system includes a kernel. The system includes means for creating, by a service executing in the second container, a delegation queue in the kernel of the operating system, means for adding, by the service executing in the second container, an identifier as a property of the delegation queue in the kernel, wherein the identifier is unique across the first container and the second container, means for opening, by a router executing in the first container, the delegation queue in the kernel using the identifier, responsive to the adding, and means for delegating the request to the service executing in the second container via the delegation queue in the kernel, responsive to the opening.

Another example system of any preceding system is provided, wherein the means for creating includes creating the delegation queue using another identifier local to the second container.

Another example system of any preceding system is provided, wherein the router in the first container obtains the identifier from a datastore external to the second container.

Another example system of any preceding system is provided, wherein the means for delegating includes means for receiving the request in a routing queue in the kernel via a network stack in the kernel, means for moving the request from the routing queue to the delegation queue in the kernel, means for receiving, at the service in the second container, the request from the delegation queue in the kernel, and means for processing the request by the service in the second container in the user mode.

Another example system of any preceding system is provided, wherein the router of the first container and the service of the second container run in separate namespaces in the user mode.

Another example system of any preceding system is provided, wherein the service of the second container runs in a namespace that is inaccessible to the router of the first container in the user mode.

Another example system of any preceding system is provided, wherein the router of the first container runs in a namespace that is inaccessible to the service of the second container in the user mode.

While this specification contains many specific implementation details, these should not be construed as limitations on the scope of any inventions or of what may be claimed, but rather as descriptions of features specific to particular embodiments of a particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A method of delegating a request between a first container in a user mode of an operating system on a webserver system and a second container in the user mode of the operating system, the operating system further including a kernel, the method comprising:
    creating, by a service executing in the second container, a delegation queue in the kernel of the operating system;
    adding, by the service executing in the second container, an identifier as a property of the delegation queue in the kernel, wherein the identifier is unique across the first container and the second container;
    opening, by a router executing in the first container, the delegation queue in the kernel using the identifier, responsive to the adding operation, wherein:
        the service executing in the second container executes in a namespace that is inaccessible to the router executing in the first container in the user mode; and
        the router executing in the first container executes in another namespace that is inaccessible to the service executing in the second container in the user mode; and
    delegating the request to the service executing in the second container via the delegation queue in the kernel, responsive to the opening operation.

2. The method of claim 1, wherein the creating operation comprises creating the delegation queue using another identifier local to the second container.

3. The method of claim 2, wherein the router executing in the first container obtains the identifier from a datastore external to the second container.

4. The method of claim 1, wherein the delegating operation comprises:
    receiving the request in a routing queue in the kernel via a network stack in the kernel;
    moving the request from the routing queue to the delegation queue in the kernel;
    receiving, at the service executing in the second container, the request from the delegation queue in the kernel; and
    processing the request by the service executing in the second container in the user mode.

5. A system for delegating a request from a first container in a user mode of an operating system to a second container in the user mode of the operating system, the system comprising:
    one or more hardware processors; and
    one or more tangible processor-readable storage media storing instructions that, when executed on the one or more hardware processors, cause the system to:
        execute a service in the second container;

create, for the service executing in the second container, a delegation queue in a kernel of the operating system;
add an identifier as a property of the delegation queue in the kernel of the operating system, wherein the identifier is unique across the first container and the second container;
execute a router in the first container, wherein:
the service executing in the second container executes in a first namespace that is inaccessible to the router executing in the first container in the user mode; and
the router executing in the first container executes in a second namespace that is inaccessible to the service executing in the second container in the user mode;
open, via execution of the router in the first container, the delegation queue in the kernel of the operating system using the identifier; and
delegate, via the opened delegation queue in the kernel of the operating system, the request from the first container to the service executing in the second container.

6. The system of claim 5, wherein the service executing in the second container is configured to create the delegation queue using another identifier local to the second container.

7. The system of claim 5, wherein the router executing in the first container obtains the identifier from a datastore external to the second container.

8. The system of claim 5, wherein:
the request is received in a routing queue via a networking stack; and
the router executing in the first container is configured to move the request from the routing queue to the delegation queue in the kernel of the operating system.

9. The system of claim 5, wherein the service executing in the second container is configured to process the request in the user mode after the request is received by the service executing in the second container from the delegation queue in the kernel of the operating system.

10. One or more tangible processor-readable storage media of a tangible article of manufacture encoding processor-executable instructions for delegating a request from a first container in a user mode of an operating system on a web server to a second container in the user mode of the operating system, the processor-executable instructions, when executed, causing the web server to perform operations comprising:

creating a delegation queue in a kernel of the operating system using a queue identifier that is unique across the first container and the second container;
opening the delegation queue in the kernel of the operating system using the queue identifier; and
delegating the request from the first container to a service executing in the second container via the delegation queue opened in the kernel of the operating system, wherein:
the service executing in the second container executes in a first namespace that is inaccessible to a router executing in the first container in the user mode; and
the router executing in the first container executes in a second namespace that is inaccessible to the service executing in the second container in the user mode.

11. The one or more tangible processor-readable storage media of claim 10, wherein the delegating operation comprises:
receiving the request in a routing queue in the kernel of the operating system via a network stack;
moving the request from the routing queue to the delegation queue in the kernel of the operating system;
receiving, at the service executing in the second container, the request from the delegation queue in the kernel of the operating system; and
processing the request by the service executing in the second container in the user mode.

12. The one or more tangible processor-readable storage media of claim 11, wherein the moving operation is executed by the router executing in the first container.

13. The method of claim 1, further comprising:
creating, by another service executing in a third container, another delegation queue in the kernel of the operating system;
adding, by the other service executing in the third container, another identifier as another property of the other delegation queue in the kernel of the operating system, wherein the other identifier is unique across the first container and the third container;
opening, by the router executing in the first container, the other delegation queue in the kernel of the operating system using the other identifier; and
delegating another request to the other service executing in the third container via the other delegation queue that has been opened in the kernel of the operating system.

* * * * *